US006474917B2

(12) United States Patent
Gauron (10) Patent No.: US 6,474,917 B2
(45) Date of Patent: Nov. 5, 2002

(54) CLIP NUTS

(76) Inventor: Jacques Gauron, P.O. Box 675, Issaquah, WA (US) 98027

( * ) Notice: Subject to any disclaimer, the term of this patent is extended or adjusted under 35 U.S.C. 154(b) by 0 days.

(21) Appl. No.: 09/794,986

(22) Filed: Feb. 27, 2001

(65) Prior Publication Data

US 2002/0119026 A1 Aug. 29, 2002

Related U.S. Application Data

(60) Provisional application No. 60/213,302, filed on Jun. 22, 2000.

(51) Int. Cl.[7] .............................. F16B 2/00; F16B 37/04; F16B 39/284
(52) U.S. Cl. ....................................... 411/112; 411/174
(58) Field of Search ................................ 411/112, 174, 411/175

(56) References Cited

U.S. PATENT DOCUMENTS 3,145,753 A * 8/1964 Kreider ...................... 411/112
4,219,064 A * 8/1980 Lozano ....................... 411/103
4,684,305 A * 8/1987 Dubost ....................... 411/174
4,883,397 A * 11/1989 Dubost ....................... 411/174

FOREIGN PATENT DOCUMENTS

| AU | 0285927 | * | 9/1968 | ................ 411/112 |
| FR | 0326481 | * | 1/1989 | ................ 411/175 |
| GB | 2041138 A | * | 9/1980 | ................ 411/112 |

* cited by examiner

Primary Examiner—Flemming Saether
Assistant Examiner—Josi Schiffman
(74) Attorney, Agent, or Firm—Delbert J. Barnard (57) ABSTRACT

A metal nut (N) is held by a plastic clip-body (12). The clip-body (12) has a first arm, a second arm and an open end that includes a cam section for camming a member into the open end. It also includes an annular locator wall that extends upwardly from the second arm of the clip-body. The upper end of this locator wall is formed to slope upwardly as it extends inwardly from the open end of the clip-body. The sloping upper end of the locator wall helps to cam the member into the clip-body. The first arm has a transverse end section (15) and sidewalls that extend upwardly from the first arm between the end section (15) and the free end of the first arm.

22 Claims, 6 Drawing Sheets

CLIP NUTS

RELATED APPLICATION

This application claims priority to provisional application Ser. No. 60/213,302, filed Jun. 22, 2000, and entitled Clip Nuts.

TECHNICAL FIELD

The present invention relates to improvements in clip nuts. More particularly, it relates to the provision of clip nuts that are simple in design, are capable of being mass-produced in an economical manner, and which will not scratch the surfaces or contribute to any corrosion of a metal member upon which they are installed.

BACKGROUND OF THE INVENTION

Clip nuts are adapted to clip onto a first member to which a second member is to be joined by use of a connector bolt or screw that extends through openings in the two members and screws into the clip nut. An example clip nut is disclosed by U.S. Pat. No. 4,219,064, granted Aug. 26, 1990, to Anthony H. Lozano, and assigned to the Shur-Lok Corporation of Irvine, California. This patent and the patent publications referred to in it provide an adequate background to this invention and are thus hereby incorporated herein for that purpose.

There is a need for an easy to manufacture clip nut that will not mar the surfaces of the member on which the clip nut is installed. An object of the present invention is to provide such a clip nut.

BRIEF SUMMARY OF THE INVENTION

The present invention provides a plastic clip nut that is easy to install onto an edge portion of a panel and which is constructed to minimize the scratching or marring of the surfaces of the panel.

Another object of the invention is to provide a clip nut having a plastic clip-body and a metal nut secured to the body in a manner permitting the nut to float in an amount sufficient to make it easy to insert a bolt into the nut. The plastic body is constructed to adequately brace the metal nut and prevent it from turning while the screw is being screwed into the metal nut.

Clip nuts of the present invention are basically characterized by a clip-body constructed from plastic and including a transverse hinge section in a first arm, close to where the first arm joins an end wall. Sidewalls are provided on the first arm. They extend upwardly from the first arm substantially throughout the full extent of the first arm between the hinge section and an open end of the clip-body opposite the end wall. The sidewalls stiffen the first arm and substantially restrict bending of the first arm to the hinge section region of the first arm.

An aspect of the present invention is to provide a clip-body having a first arm and a second arm in which the first arm includes an opening in a region of the first arm that is substantially parallel to the second arm, and in which the first arm slopes downwardly as it extends from the transverse hinge section to the region in the first arm that includes the opening.

Another aspect of the invention is to provide a cam section at the open end of the clip-body, having a cam surface that slopes upwardly and endwise outwardly at the open end of the clip-body. The cam surface serves to cam a member into the clip-body between the first and second arms of the clip-body.

A further aspect of the invention is to provide the second arm with an opening and an annular locator wall extending up from the second arm around the opening. In preferred form, the annular locator wall has an upper end that is in a plane that slopes upwardly as it extends inwardly of the clip-body from the open end of the clip-body. This end surface of the annular locator wall serves to cam a member into the clip-body between the first and second arms of the clip-body.

In one embodiment, the first arm includes a pair of laterally extending fences on opposite sides of the opening in the first end of the first arm. A nut is provided which includes a base having end edges that are substantially parallel to the fences. The width of the base of the nut between the end surfaces is smaller than the distance between the two fences. Preferably also, the base of the nut includes side edges that are spaced apart a distance smaller than the spacing across the clip-body between the sidewalls.

Objects, advantages and features of the invention will become apparent from the description set forth below, from the drawings, and from the principles that are embodied in the specific structures that are illustrated and described.

BRIEF DESCRIPTION OF THE SEVERAL VIEWS OF THE DRAWING

Like reference numerals and letters refer to like parts throughout the several views of the drawing, and.

DETAILED DESCRIPTION OF THE PREFERRED EMBODIMENT

The various concepts or principles which make up the invention can be best understood by considering the following description of example embodiments of the invention.

Figure 1:
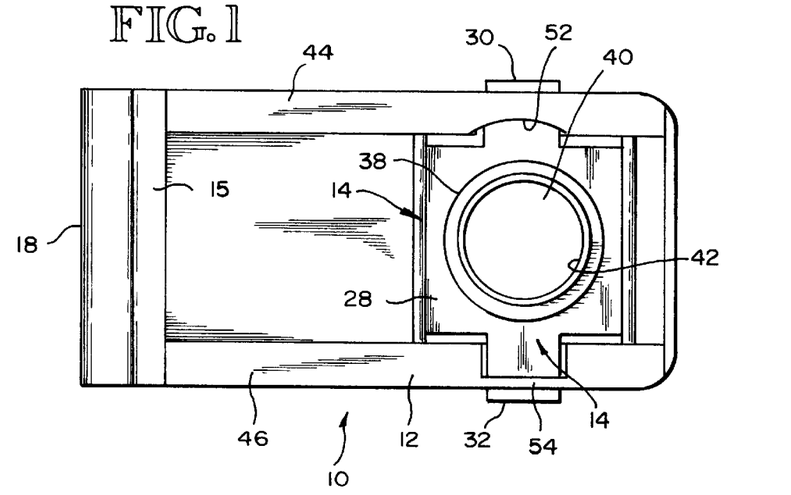
FIG. 1 is a plan view of a preferred embodiment of the invention, such view showing a metal nut member mounted in a plastic clip body.
Figure 2:
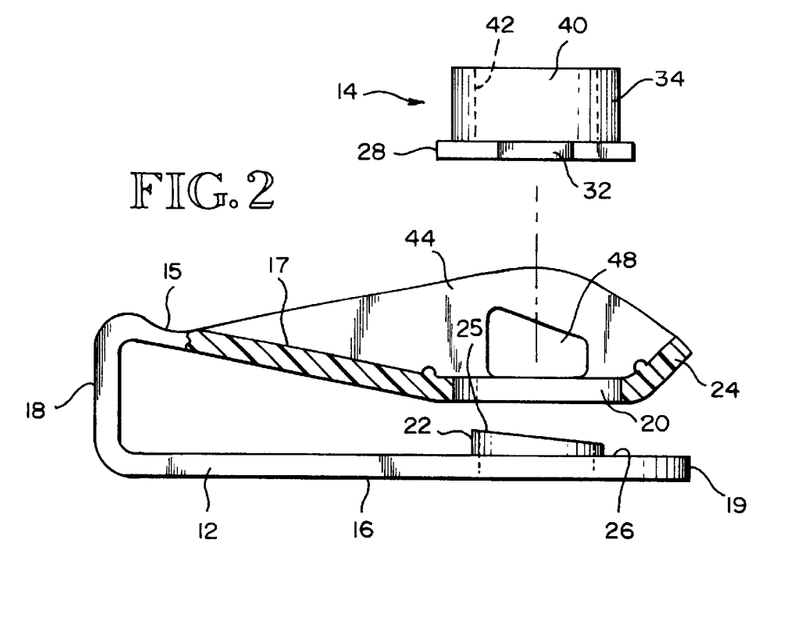
FIG. 2 is a side elevational view of the clip nut shown by FIG. 1, with the metal nut member disconnected from the plastic clip body and spaced above it.
Figure 3:
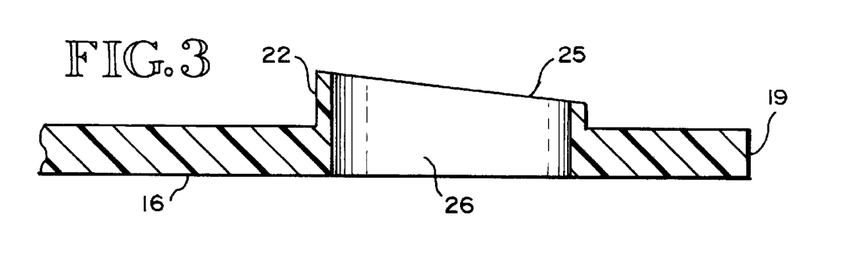
FIG. 3 is an enlarged scale sectional view taken through an alignment flange portion of the plastic clip body, such view being taken substantially along line 3—3 of FIG. 4.
Figure 4:
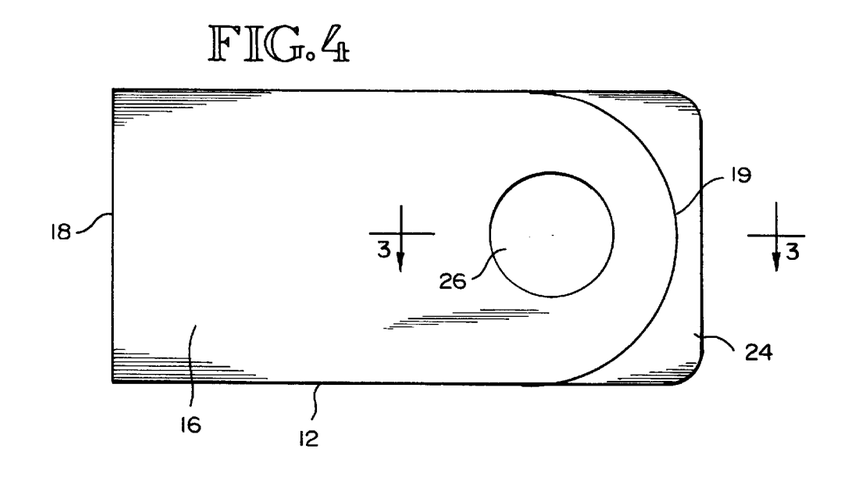
FIG. 4 is a plan view opposite the FIG. 1 plan view.

Referring to FIGS. 1, 2 and 4–6, the illustrated clip nut 10 comprises a plastic clip body 12, constructed from a structural plastic, and a metal nut member 14. Plastic clip body 12 comprises a first arm portion 17 connected to a second arm portion 16 by an end wall or bight portion 18. The thickness of the arm 17 is reduced by a transverse groove 15 to form a hinge section at the base of the groove 15. Arm portion 17 includes a through opening 20. Arm portion 16 includes a rounded end 19 and an annular alignment flange 22 that projects from arm portion 16 towards the opening 20. End 19 may be of substantially circular curvature. Flange 22 includes a sloping end surface 25 and a circular opening 26 (FIG. 3).

End portion 24 of arm 17 extends at an angle from the adjacent region of arm portion 17 in which opening 20 is situated. The sloping end surface 25 on the boss 40 makes an acute angle with the inner surface 26 of arm 16. The diameter of opening 20 is larger than the outside diameter of the annular flange 22. This allows the arm portion 17 to move relative to the arm portion 16 without there being contact between the annular flange 22 and the boundary of opening 20.

Preferably the plastic clip body 12 of the clip nut 10 is molded or otherwise formed in one piece from Torlon™, or a similar structural plastic material. Torlon™ is both strong and flexible. Torlon™ is disclosed and claimed in U.S. Pat. No. 4,902,180, granted Feb. 20, 1990, to Richard F. Gauron. Torlon™ is manufactured by Amoco Performance Products, Inc. of Ridgefield, Conn. 08677. Torlon™ is a polymer that is tough enough to replace metal. It is highly resistant to wear and fatigue. It is particularly suitable for use in making the plastic clip bodies of the invention because it is both strong and flexible. Most structural plastics are either strong or flexible but not both.

The metal nut member 14 has a base 28 that may be square or rectangular in plan form, as shown by FIG. 1. Metal nut member 14 is essentially the same as the nut 34 shown in the aforementioned U.S. Pat. No. 4,219,064 but longer to provide more base metal outwardly of the tubular part 84. The base 28 of the metal nut member 14 includes a pair of tabs 30, 32 which project in opposite directions from the base 28. An upstanding annular member 34 is connected to the base 38. It includes a center opening 40 that is provided with internal threads 42. The longer base provides nut 14 with a larger footprint in contact with the plastic below it. This guards against the lower edge of part 34 cutting into the plastic when a bolt is tightened in the nut 14.

Arm 17 includes a pair of sidewalls 44, 46 that project upwardly from the arm 17 along its opposite sides. Sidewalls 44, 46 include tab receiving openings 48, 50. A side elevation view of opening 48 is shown by FIG. 2. The opening 50 in sidewall 46 preferably is the same as opening 48 in side elevation. The base 28 of the metal nut member 14 is positioned above the arm 17 and its tab 30 is aligned with opening 48. Then the metal nut member 14 is moved towards sidewall 44 until the outer surface of boss 34 moves into recess 52. At that time, the wall section 54 is bendable outwardly enough to allow tab 32 to slip downwardly into opening 50. The tabs 30, 32 and openings 48, 50 mount the metal nut member 14 so that it can "float" relative to the plastic clip member 12, both lengthwise and crosswise. Ribs 56, 58 may be formed on the upper surface of arm 17 laterally outwardly of the base 28. The front and rear edges of the base 28 will contact these ribs 56, 58 as the metal nut member 14 slides sideways on the upper surface of the arm 17.

Figure 5:
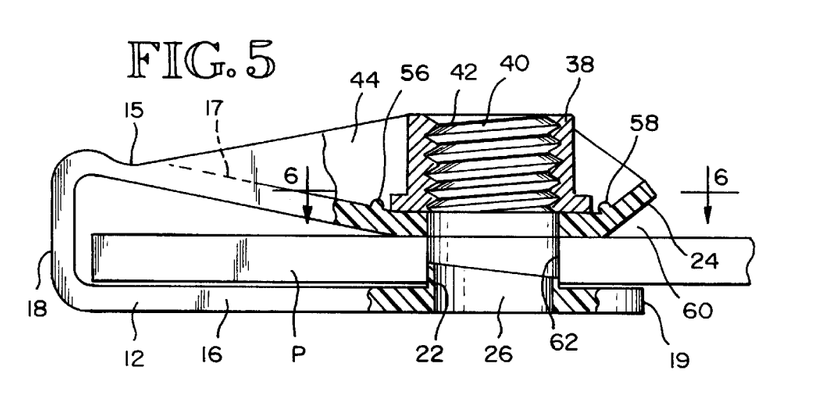
FIG. 5 is a view like FIG. 2, but with the metal nut member connected to the plastic clip body, and with the metal nut member and portions of the plastic clip body shown in section, said section being taken substantially along line 5—5 of FIG. 6, such view also showing the clip nut clipped onto a panel.
Figure 6:
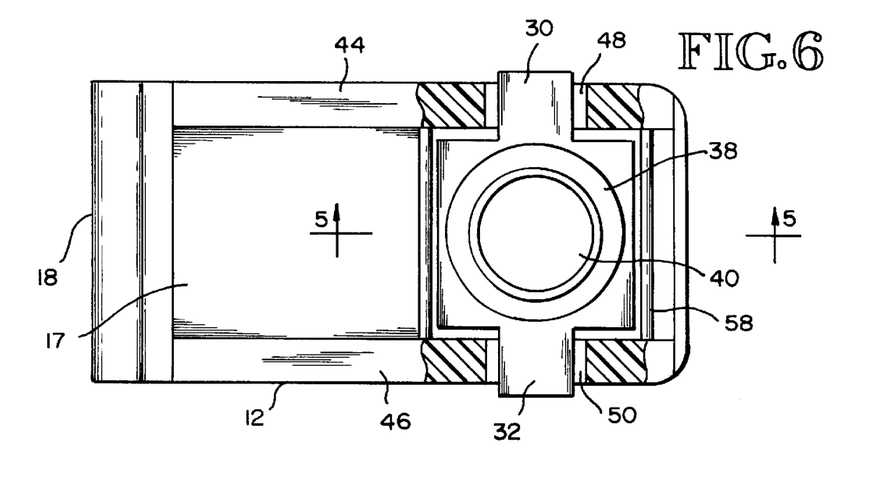
FIG. 6 is another plan view like FIG. 1 but with a portion of the plastic clip shown in section, such section being taken substantially along line 6—6 of FIG. 5.
Figure 7:
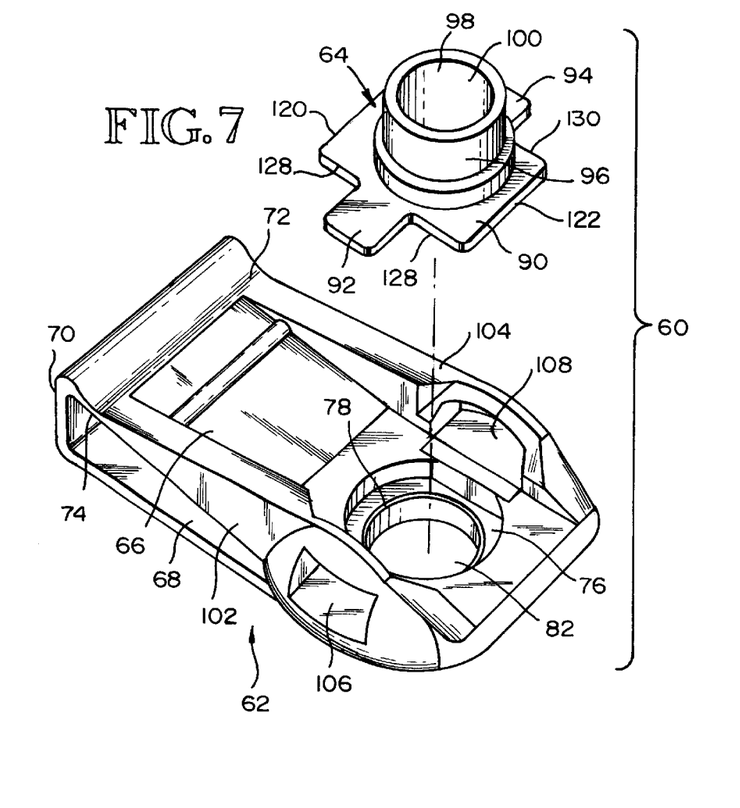
FIG. 7 is a pictorial view of a modified form of a clip nut, such view being taken from above and looking down towards the first arm, the open end and one side of the clip nut, and showing the nut exploded up and away from the clip-body.
Figure 8:
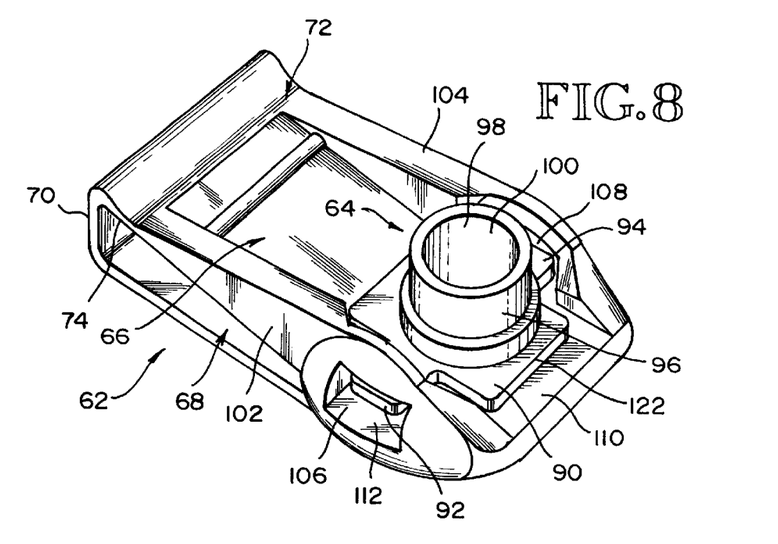
FIG. 8 is a view like FIG. 7, but showing the nut secured to the clip-body.
Figure 9:
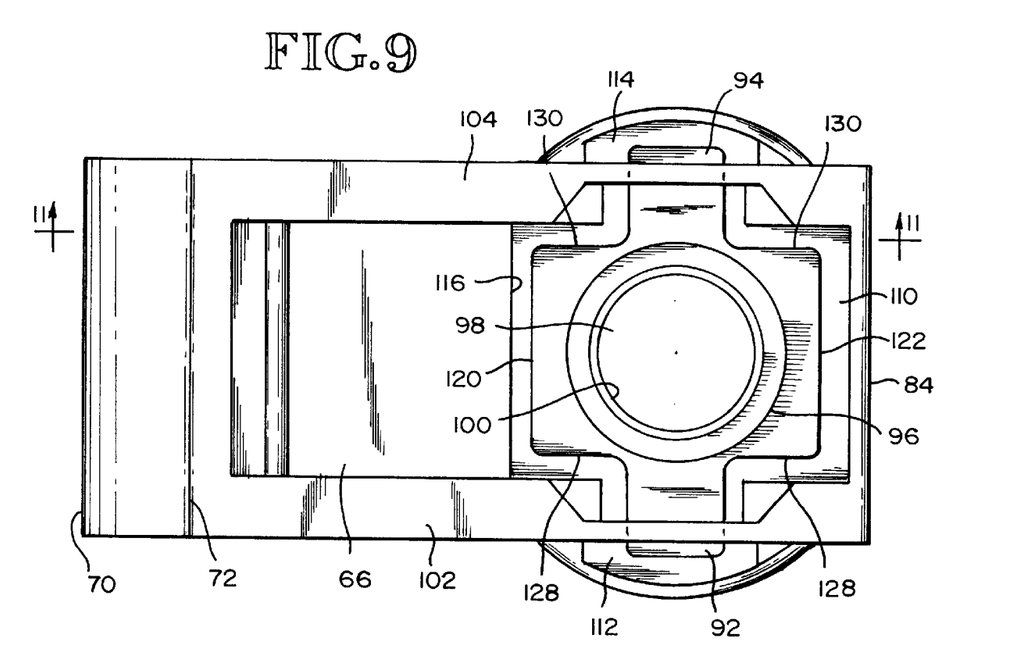
FIG. 9 is a top plan view of the clip nut shown by FIG. 7 and 8.

Referring to FIG. 5, an avenue 60 is formed by and between arms 17 and 16. This avenue 60 receives an edge portion of a panel P. This panel P is inserted through opening 60 between arm portion 16 and arm portion 17. This requires the arm portions 16, 17 to move relatively apart until the panel P is between them and an opening 64 in the panel P is in alignment with the annular member 22. The reduced thickness section at the base of groove 15 acts as a hinge and is where bending occurs. opening 62 is larger in diameter than the outside diameter of the annular member 22. Thus, when annular boss 22 is aligned with the opening 62, the annular boss 22 quite readily moves into the opening 62 in the panel P. When the panel P is between the arm portions 17, 16, one surface of it is in contact with the inner surface of the upper arm portion 17. Initially, the two inside surfaces of the arm portions 17, 16 may be at a slight angle to each other.

The sidewalls 44, 46 stiffen the arm 17 and give it a channel shape cross section throughout most of its length. The surfaces of the plastic clip body 12 that contact the panel P when the panel P is inserted through the avenue 60 are all soft and smooth surfaces that will not mar or scratch the material from which the panel P is made. Sloping surfaces 24,25 help cam the panel P into the plastic clip body 12. When the clip nut 10 is installed on to a panel P, another panel (not shown) can be moved against arm 16. Then, the threaded shank of a bolt or screw (not shown) is inserted through opening 26 and threaded into the threaded opening 40. When this bolt is tightened, it will firmly secure the two panels together. Typical connections of this type, using clip nuts of a different construction, are disclosed by the aforementioned U.S. Pat. No. 4,219,064, and by U.S. Pat. No. 3,670,796, granted Jun. 20, 1972, to David W. Grimm; by U.S. Pat. No. 4,375,933, granted Mar. 8, 1983, to Donald H. Hassler and Paul V. Pagel and by U.S. Pat. No. 4,676,706, granted Jun. 30, 1987, to Akio Inaba.

When a bolt (not shown) is inserted through opening 26 and then threaded into opening 40, the arm 17 will first bend in the hinge region below groove 15. As the bolt is tightened, the flat region of arm 17 which includes the opening 20 is drawn down into tight engagement with a portion of the panel P (FIG. 5). In order for this to happen, there may be some distortion of arm 16 and end wall 18. The sidewalls 44, 46 hold the arm 17 relatively rigid except in the region of the hinge section 15. As best shown by FIG. 5, the annular wall 78 projects into the opening 62 in panel P and maintains opening 62 aligned with opening 26.

FIGS. 7–15 show a second embodiment of the invention. It is basically the same as the embodiment shown by FIGS. 1–6, but it will be described in its entirety.

Figure 10:
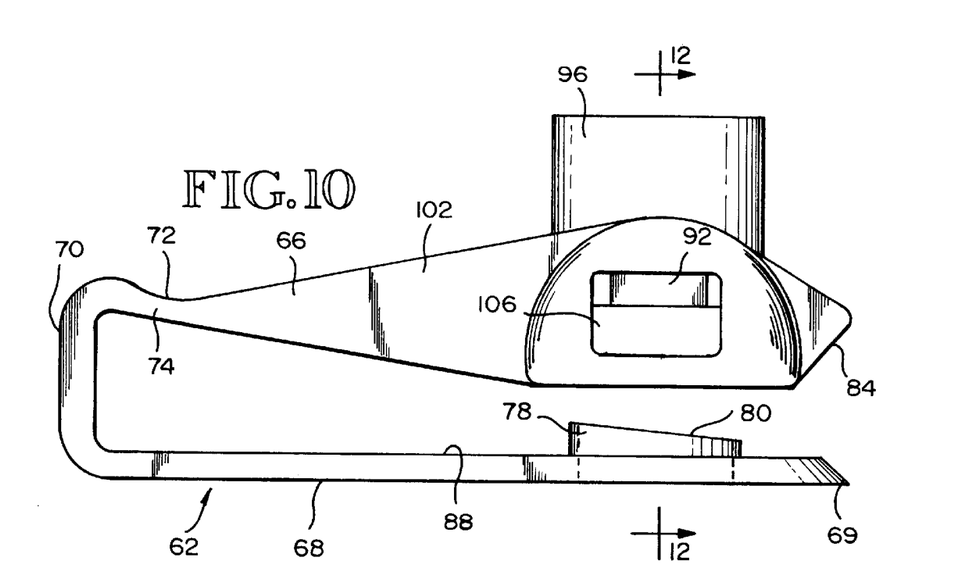
FIG. 10 is a side elevational view of the clip nut shown by FIGS. 7–9.
Figure 11:
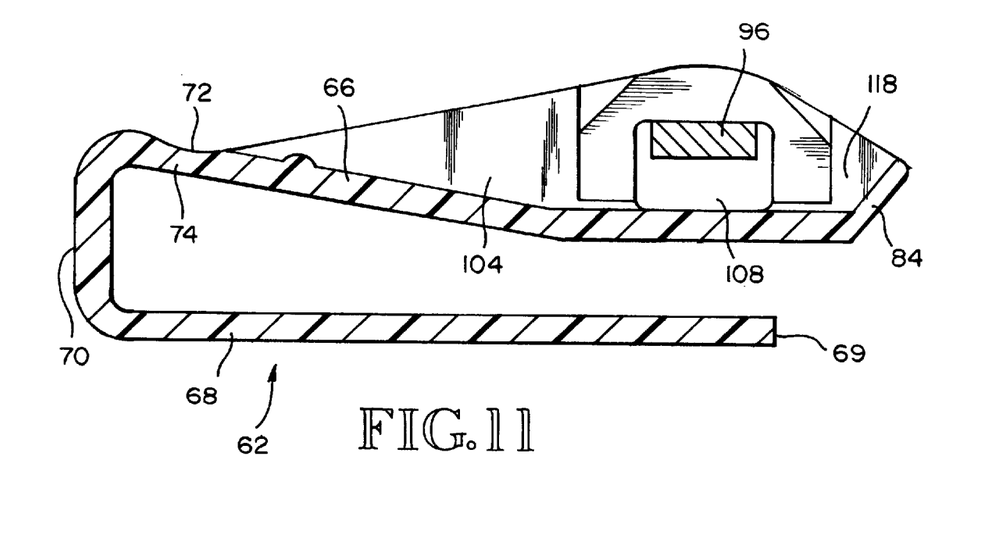
FIG. 11 is a longitudinal sectional view taken substantially along line 11—11 of FIG. 9.
Figure 12:
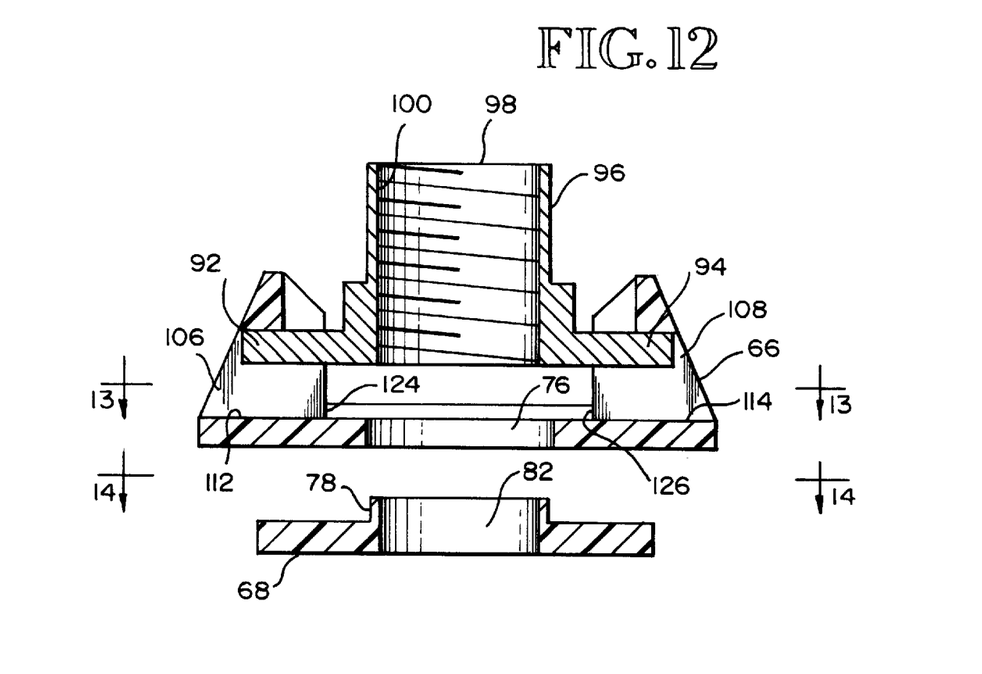
FIG. 12 is a cross sectional view taken substantially along line 12—12 of FIG. 10.
Figure 13:
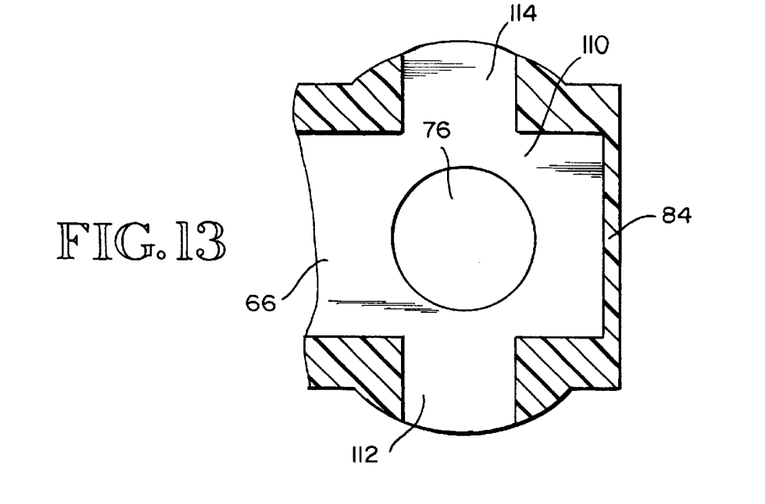
FIG. 13 is a sectional view taken substantially along line 13—13 of FIG. 12.
Figure 14:
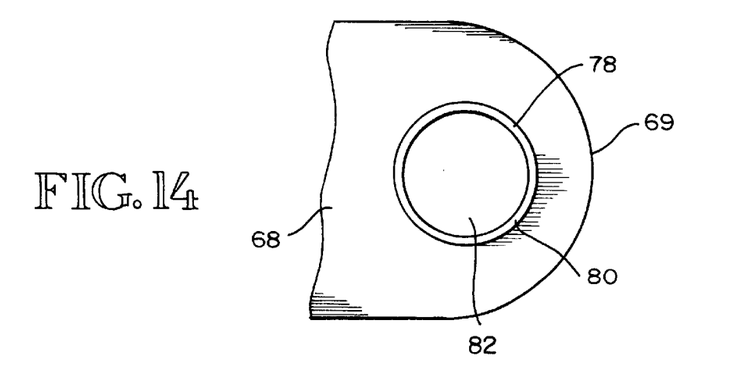
FIG. 14 is a sectional view taken substantially along lines 14—14 of FIG. 12.
Figure 15:
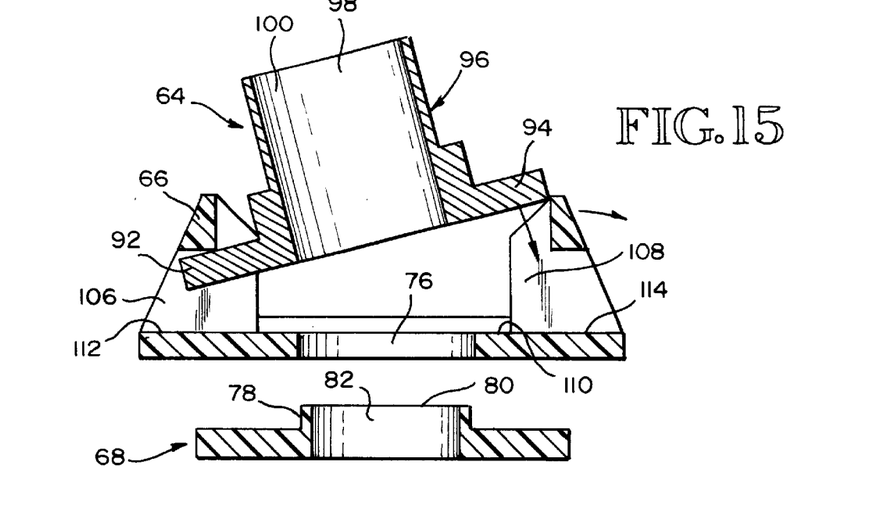
FIG. 15 is a view like FIG. 12, but showing the nut in the process of being inserted into the place for it in the clip-body.

The embodiment of FIGS. 7–15 is designated 60. It comprises a plastic clip body 62, constructed from a structural plastic, and a metal nut member 64. Plastic clip body 62 comprises a first arm portion 66 connected to a second arm portion 68 by an end wall or bight portion 70. The thickness of the arm portion 66 is reduced by a transverse groove 72 to form a hinge section 74 at the base of the groove 72. Arm portion 66 includes a through opening 76. Arm portion 68 includes a rounded end 69 (e.g. circular) and an annular alignment flange 78 that projects from arm portion 68 towards the opening 76. Flange 78 includes a sloping end surface 80 (FIG. 10) and a circular opening 82 (FIGS. 12, 14 and 15).

End portion 84 (FIGS. 10 and 11) of arm portion 66 extends at an angle (e.g. 450) from the adjacent region of arm portion 66 in which opening 76 is situated. The sloping end surface 80 of the boss 78 makes an acute angle with the inner surface 88 of arm 68. The diameter of opening 76 is larger than the outside diameter of the annular flange 78. This allows the arm portion 66 to move relative to the arm portion 68 without there being contact between the annular flange 78 and the boundary of opening 76. See FIG. 12. End portion 69 (FIG. 10) of arm portion 68 also extends at an angle (e.g. 45° C.) from the adjacent inner surface of arm 68. Sloped surfaces 84, 69 function to cam the clip onto a plate P. Sloped surface 69 also provides a lip for receiving a removal tool.

Preferably the plastic clip body 62 of the clip nut 60 is molded or otherwise formed in one piece from Torlon™ or a similar structural plastic material. Torlon™ is both strong and flexible. Torlon™ is disclosed and claimed in U.S. Pat. No. 4,902,180, granted Feb. 20, 1990, to Richard F. Gauron. Torlon™ is manufactured by Amoco Performance Products, Inc. of Richfield, Conn. 08677. Torlon™ is a polymer that is tough enough to replace metal. It is highly resistant to wear and fatigue. It is particularly suitable for use in making the plastic clip bodies 62 of the invention because it is both strong and flexible. Most structural plastics are either strong or flexible but not both.

The metal nut 64 is like metal nut 14. Metal nut member 64 is essentially the same as the nut 34 shown in the aforementioned U.S. Pat. No. 4,219,068. The base 90 of the metal nut member 64 includes a pair of tabs 92, 94 which project in opposite directions from the base 90. An upstanding annular member 96 is connected to the base 90. It includes a center opening 98 that is provided with internal threads 100 (FIG. 12).

When a bolt is inserted through opening 76 and screwed into the threaded opening 98 in the nut 96, the upper arm 66 will be drawn towards the arm 68. Initially, arm 66 will bend in region 74 below the groove 72. Then, when the flat portion of arm 66 through which opening 76 extends is in contact with a panel that has been inserted between the arms 66, 68. Further tightening of the bolt will cause the end portion that includes opening 76 to move flat against the adjacent surface of the panel. In order for this to happen, there is some more give in the regions 68, 70, 72, 74.

In both embodiments, the panel that is inserted between the upper and lower arms may be thicker than the static distance between the upper and lower arms at the open end of the clip member 62. At first, the insertion of the panel between the arms will spread the arms apart and make them diverge apart somewhat at the open end of the clip member 62. Then, when the bolt is screwed into the nut, the end portion of arm 66 will be drawn down flat against the panel. This will cause some bending in region 74 below the groove 72. It might also cause some distortion of member 68 relative to member 70 and member 70 relative to member 66.

Arm 68 includes a pair of sidewalls 102, 104 that project upwardly from the arm 66 along its opposite sides. Sidewalls 102, 104 include tab receiving openings 106, 108. A side elevation of opening 106 is shown in FIG. 10. A side elevation of opening 108 is shown in FIG. 11. Thus, it can be seen, the two openings 106, 108 are essentially the same in size and shape. Referring to FIG. 13, the upper surface 110 of arm 66 is flat where it surrounds opening 76. Side extensions 112, 114 of surface 110 are substantially coplanar with surface 110. The base 90 of the nut member 64 rests on the surface 110 and the coplanar bottom surfaces of the tabs 92, 94 rest on the surfaces 112, 114. FIG. 15 shows tab 92 being placed in opening 106. Tab 90 is then pushed on until it snaps into opening 108. Once in the openings 106, 108, the tabs 92, 94 mount the metal nut member 64 so that it can "float" relative to the plastic clip member 62. Fences 116, 118 are parallel to the end edges 120, 122 on the base 90 of the nut member 64. Sidewalls 102, 104 present side fence surfaces 124, 126 that are parallel to each other and to the side edge surfaces 128, 130 on the base 90 of nut member 64. When the nut member 64 is connected to the clip body 62, the nut member 64 can float in position on surfaces 110, 112, 114, both endwise and sidewise of the clip body 62. This "float" allows enough movement of the nut member 64 to assure alignment of the bolt or screw through opening 82 and into threaded opening 98. When the bolt or screw is tightened by a screwdriver or wrench, the torque is reacted by contact of the edge surfaces 120, 122, 128, 130 with the fence surfaces.

As clearly shown by FIGS. 7, 8, 12, 13 and 15, the arm 66 is widened in the vicinity of the opening 76 so as to provide material outwardly of and below the openings 106, 108, so as to strengthen the clip member 62 in these regions. It also provides reinforced side regions for the openings 106, 108. These regions are contacted by the tabs 92, 94 when the bolt or screw is screwed into the threaded opening 98.

The illustrated embodiments are only examples of the present invention and, therefore, are non-limitive. It is to be understood that many changes in the particular structure, materials and features of the invention may be made without departing from the spirit and scope of the invention. Therefore, it is my intention that my patent rights not be limited by the particular embodiments illustrated and described herein.

What is claimed is:

1. In a clip nut comprising a clip-body having a first arm with first and second ends, a second arm with first and second ends, an end wall connecting the second end of the first arm to the second end of the second arm, and forming a closed end for said clip-body, with the opposite end of the clip-body being open, a pair of sidewalls projecting upwardly from the first arm and including a first pair of aligned openings, and a second pair of aligned openings in the first ends of the first and second arms; and a nut having a base, a tubular body extending upwardly from the base and including an internally threaded central opening, said base including a pair of tabs projecting radially outwardly from it on diametrically opposite locations on said base;

wherein the base of the nut sets on the first arm between the sidewalls and the tabs on the nut extend through the first pair of aligned openings and position the opening in said tubular body in substantial coaxially alignment with the second pair of aligned openings, wherein in use a member is received between the first and second arms and a bolt is inserted first through the opening in the second arm, then through the member, and is then screwed into the threaded central opening and the improvement comprising:

said clip-body being constructed from plastic and including a transverse hinge section in the first arm closely adjacent where the first arm meets the end wall, and wherein the sidewalls extend upwardly from the first arm substantially throughout the full extent of the first arm between the hinge section and the open end of the clip-body, and wherein the sidewalls stiffen the first arm and substantially restrict bending of the first arm to the hinge section region of the first arm when the screw is tightened; and wherein said first arm includes a pair of laterally extending fences on opposite sides of the opening in the first end of the first arm, and the base of the nut has end edges that are substantially parallel to the fences, and the width of the base of the nut between the end surfaces is smaller than the distance between the two fences.

2. The clip nut of claim 1, wherein the first end of the first arm includes a region that is substantially parallel to the second arm and includes the opening that is in the first end of the first arm.

3. The clip nut of claim 2, wherein the first arm slopes downwardly as it extends from the transverse hinge section to the region that includes the opening.

4. The clip nut of claim 3, wherein the first arm includes a cam section at the first end of the first arm presenting a cam surface that slopes upwardly and endwise outwardly at the open end of the clip-body.

5. The clip nut of claim 4, wherein the first end of the second arm is rounded.

6. The clip nut of claim 5, wherein the second arm includes an annular locator wall extending up from the second arm around the opening in the first end of the second arm.

7. The clip nut of claim 6, wherein the annular locator wall has an upper end that is in a plane that slopes upwardly as it extends inwardly of the clip-body from the first end of the second arm, whereby the cam wall and the end surface of the annular locator wall both serve to cam the member into the clip-body between the first and second arms of the clip-body.

8. The clip nut of claim 1, wherein the first arm includes a cam section at the first end of the first arm presenting a cam surface that slopes upwardly and endwise outwardly at the open end of the clip-body.

9. The clip nut of claim 8, wherein the second arm includes an annular locator wall extending up from the second arm around the opening in the first end of the second arm.

10. The clip nut of claim 9, wherein the annular locator wall has an upper end that is in a plane that slopes upwardly as it extends inwardly of the clip-body from first end of the second arm, whereby the cam wall and the end surface of the annular locator wall both serve to cam the member into the clip-body between the first and second arms of the clip-body.

11. The clip nut of claim 1, wherein the base of the nut includes side edges that are spaced apart a distance smaller than the spacing across the clip-body between the sidewalls.

12. The clip nut of claim 11, wherein the first pair of aligned openings have widths that are wider than the widths of the tabs that fit into such openings, whereby the nut floats crosswise and lengthwise of the clip-body a small amount that is restrained by the first pair of openings in the sidewalls, by the lateral space between the sidewalls and by the longitudinal space between the fences.

13. The clip nut of claim 12, wherein the first end of the first arm includes a region that is substantially parallel to the second arm and includes the opening that is in the first end of the first arm.

14. The clip nut of claim 13, wherein the first arm slopes downward as it extends from the transverse hinge section to the region that includes the opening.

15. The clip nut of claim 14, wherein the first arm includes a cam section at the first end of the first arm presenting a cam surface that slopes upwardly and endwise outwardly at the open end of the clip-body.

16. The clip nut of claim 15, wherein the second arm includes an annular locator wall extending up from the second arm around the opening in the first end of the second arm.

17. In a clip nut comprising:

a plastic clip-body having a first arm with first and second ends, a second arm with first and second ends, an end wall connecting the second end of the first arm to the second end of the second arm, and forming a closed end for said clip-body, with the opposite end of the clip-body being open, a pair of sidewalls projecting upwardly from the first arm and including a first pair of aligned openings, and a second pair of aligned openings in the first ends of the first and second arms; and a nut having a base, a tubular body extending upwardly from the base and including an internally threaded central opening, said base including a pair of tabs projecting radially outwardly from it on diametrically opposite locations on said base;

wherein the base of the nut sets on the first arm between the sidewalls and the tabs on the nut extend through the first pair of aligned openings and position the opening in said tubular body in substantial coaxially alignment with the second pair of aligned openings;

wherein in use a member is received between the first and second arms and a bolt is inserted first through the opening in the second arm, then through the member, and is then screwed into the threaded central opening;

wherein said first arm includes a pair of longitudinally spaced apart, laterally extending fences, in the first end of the first arm, with the opening in the first end of the first arm being between the fences, wherein the base of the nut has end edges that are substantially parallel to the fences, and the width of the base of the nut between the end surfaces is smaller than the distance between the two fences; and wherein the base of the nut includes side edges that are spaced apart a distance smaller than the spacing across the clip-body between the sidewalls.

18. The clip nut of claim 17, wherein the first pair of aligned openings have widths that are wider than the widths of the tabs that fit into such openings, whereby the nut floats crosswise and lengthwise of the clip-body a small amount that is restrained by the first pair of openings in the sidewalls, by the lateral space between the sidewall and by the longitudinal space between the fences.

19. The clip nut of claim 18, wherein the first end of the first arm includes a region that is substantially parallel to the second arm and includes the opening that is in the first end of the first arm.

20. The clip nut of claim 19, wherein the first arm slopes downward as it extends from the end wall to the region that includes the opening.

21. The clip nut of claim 20, wherein the first arm includes a cam section at the first end of the first arm presenting a cam surface that slopes upwardly and endwise outwardly at the open end of the clip body.

22. The clip nut of claim 21, wherein the second arm includes an annular locator wall extending up from the second arm around the opening in the first end of the second arm.

* * * * *